United States Patent [19]
Bieg et al.

[11] Patent Number: 6,028,304
[45] Date of Patent: Feb. 22, 2000

[54] PRECISION DISPLACEMENT REFERENCE SYSTEM

[75] Inventors: Lothar F. Bieg; Robert R. Dubois, both of Albuquerque; Jerry D. Strother, Edgewood, all of N.Mex.

[73] Assignee: Sandia Corporation, Albuquerque, N.Mex.

[21] Appl. No.: 09/010,270

[22] Filed: Jan. 21, 1998

[51] Int. Cl.$^7$ ..................................................... G01D 5/347
[52] U.S. Cl. ................. 250/231.13; 250/231.14; 250/231.17
[58] Field of Search ............................ 250/231.1, 231.13, 250/231.14, 231.15, 231.16, 231.17, 231.18, 232, 233, 555; 356/376; 82/133, 136, 141; 318/640; 324/160, 163, 164, 165, 175

[56] References Cited

U.S. PATENT DOCUMENTS

| | | | |
|---|---|---|---|
| 3,858,053 | 12/1974 | Burnett | 250/555 |
| 4,331,866 | 5/1982 | Batzdorff | 250/231.18 |
| 4,427,882 | 1/1984 | Nakaoki et al. | 250/231.14 |
| 4,468,617 | 8/1984 | Ringwall | 250/231.16 |
| 4,789,874 | 12/1988 | Majette et al. | 250/231.1 |

*Primary Examiner*—John R Lee

[57] ABSTRACT

A precision displacement reference system is described, which enables real time accountability over the applied displacement feedback system to precision machine tools, positioning mechanisms, motion devices, and related operations. As independent measurements of tool location is taken by a displacement feedback system, a rotating reference disk compares feedback counts with performed motion. These measurements are compared to characterize and analyze real time mechanical and control performance during operation.

13 Claims, 1 Drawing Sheet

PRECISION DISPLACEMENT REFERENCE SYSTEM

This invention was made with Government support under Contract DE-AC04-94DP85000 awarded by the U.S. Department of Energy. The Government has certain rights in the invention.

BACKGROUND

The present invention relates generally to the field of precision machining and, more particularly, to a simple class of techniques and apparatus therefor which provide automatic sensing and characterization of abnormal operating states of precision machine tools, positioning mechanisms and motion devices.

Precision machining and assembly require very high absolute precision as well as very high positional resolution to obtain significant product yield. In particular, when precision manufacturing is automated, simple and robust techniques are required to provide feedback to the controller about the precise relative positions of the current workpiece surface and, e.g., a machine tool being used to form the workpiece.

The current state of the art in the area of measuring linear and/or angular displacements (or equivalently positions) involves considerable use of feedback systems (encoders, grating scales, laser interferometers, etc.), which produce an electronic output (typically digital counts) proportional to a input motion. Encoders are capable of providing extremely high-resolution feedback on the function of a machine tool. Rotational position is generally measured directly using a rotary encoder, and linear position can be measured using a linear encoder, or by using a rotary encoder connected to the drive of, e.g., a lead screw on a machine tool.

Machine tools are commonly equipped with encoders (usually optical in nature) which provide high-resolution position feedback to an intelligent machine tool controller, which uses this feedback to control the operation or motion of the cutting tool. One type of modern optical encoder, sometimes called a grating-based encoder, functions by detecting the light-to-dark transitions which occur as motion of the encoder input moves precisely placed lines on a reference reticle past a photodetector subassembly. The output is typically a series of pulses which are counted to determine the total magnitude of the displacement. Linear displacements are measured using lines on a sliding reticle, and angular displacements are measured using lines on a rotating reticle. Optical encoders with rotational resolution of 1 arc-second or less are commercially available, as are optical encoders with a linear resolution of 1 micron or less.

Other types of encoders exist which, although they function using different principles, essentially provide the same sort of displacement information as those described above. These would include sine/cosine optical encoders, laser interferometers, inductively triggered encoders, Hall effect encoders, mechanically triggered encoders, and the like. Such encoders are typically either more complex or have lower performance than the grating based optical encoders described above, but are compatible in principle with the present invention.

Unfortunately, there are significant complications in relating the information provided by such encoders to exactly what the machine tool is doing. As an example, an encoder can be used to measure the rotary input to a lead screw on a lathe. The machine tool controller can mathematically convert the encoder output into linear displacement of the tool relative to the workpiece given the pitch of the screw, the known irregularities in that pitch, and such factors as the magnitude of the mechanical backlash of the machine tool drive. However, one cannot take into account such factors as contaminants and particles on the lead screw, backlash which differs (e.g., due to ongoing wear) from that expected from previous characterization of the machine tool, the onset of mechanical defects in the tool, defects in the encoder, its electronics, or its linkage to the machine tool, or complete failure of the feedback controller. This last is perhaps the most important abnormal condition to detect. In addition to piece wastage, such out-of-control function may result in fundamental damage to the machine tool and in a safety hazard as well. Feedback provided only by a simple encoder per motion axis, however, cannot easily be used to alert the machine tool controller to these abnormal conditions.

There is therefore a need for a simple independent reference diagnostic which allows the state of the machine tool to be checked against a standard routinely during operations. Such a diagnostic will insure that an automated machine tool is presently functioning within tolerances suitable for the current workpiece, allows prediction of when maintenance operations will be necessary, allows detection of current operations outside of tolerances, and prevents run-away failure modes.

SUMMARY

The present invention relates generally to a new class of precision displacement reference systems, which detect deviations of a machine tool's function from expected tolerances. In such a system, a tool bit is moved by mechanical apparatus comprising a driven input. The mechanical apparatus comprised an encoder system which provided high-resolution positional feedback to a machine tool controller. The encoder output is compared in real time against an independent state reference provided by counting discrete quanta of the driven input (e.g., number of complete rotations for a rotary driven input). Discrepancies between the encoder output and the independent state reference alert the machine tool controller to abnormal operation of the machine tool. Such precision displacement reference systems are especially useful for precision measurement and precision machining operations. Both general principles and specific implementations of this invention will be presented. Presentation of specific implementations, however, is not intended to limit the scope of the invention as described in the claims.

BRIEF DESCRIPTION OF THE DRAWINGS

The accompanying drawings, which are incorporated in and form part of the specification, illustrate the present invention and, together with the description, serve to explain the invention.

DESCRIPTION

Figure 1:
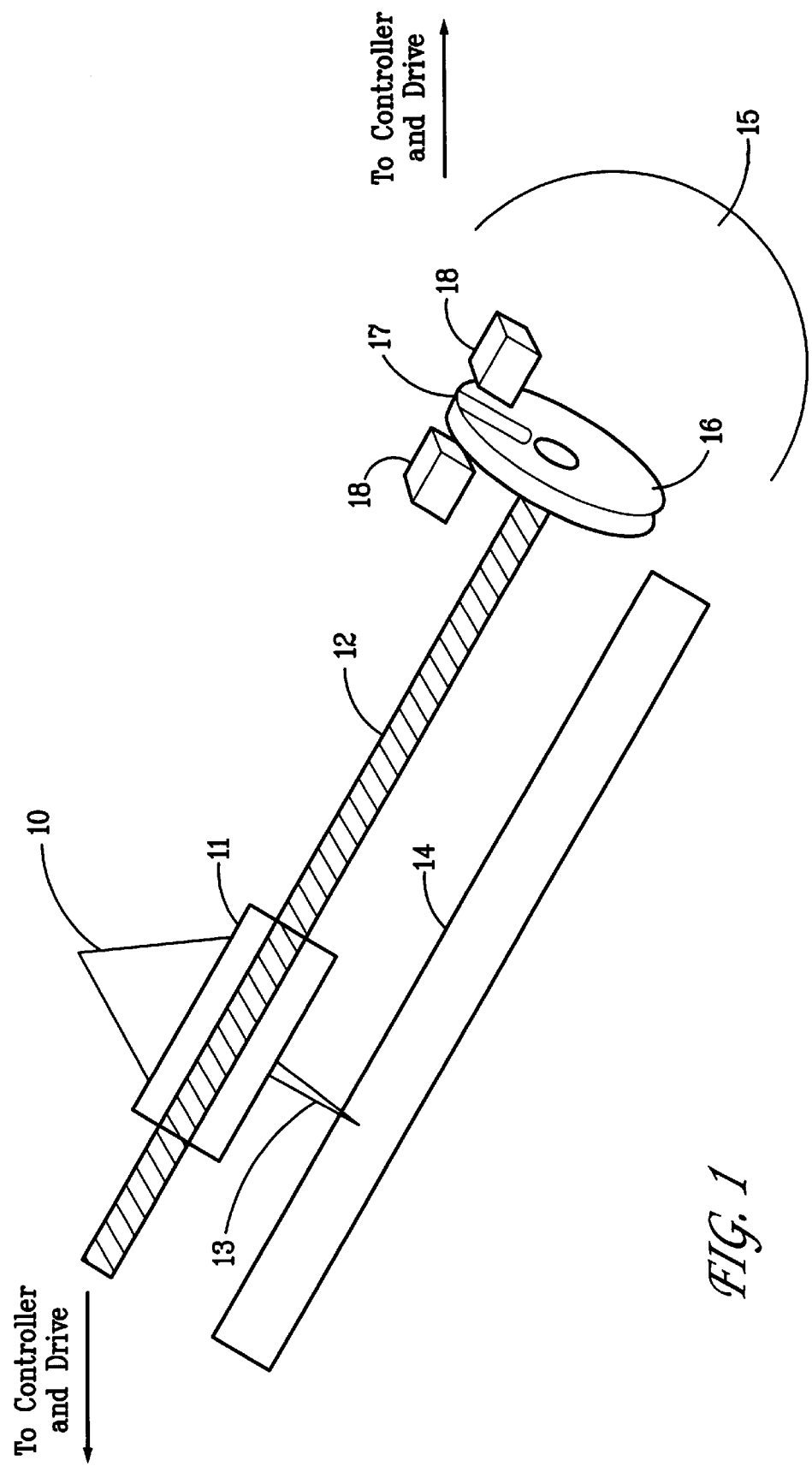
FIG. 1. Schematic illustration of a precision displacement reference system.

The present invention provides precision manufacturing equipment with the ability to detect abnormal operating conditions with the intent of certifying a machining operation en passant, of predicting time till the next required maintenance period (based not on predetermined intervals but rather on the current functioning of the equipment and the measured rate of degrading performance), of detecting out-of tolerance operations so as to minimize wastage of time and material, and of preventing out-of-control operations when the primary control system fails.

The principle of the present invention is to provide a precision machine tool with an independent state reference intended to provide a representation of the state of a machine tool which is independent of the primary high-resolution position feedback sensor of said tool. When the tool is operating properly (i.e., consistent with previously characterized behaviors, including well-characterized mechanical irregularities and backlash), the information provided by the primary high-resolution position feedback sensor (as processed through an appropriate mathematical model of said previously characterized behaviors) and the independent state reference will reflect consistent states of the machine tool.

Should the two tool states be inconsistent, operator action will depend on the magnitude of the inconsistency and the machining operation currently underway and planned. If the inconsistency suggests potential errors within the specified tolerances for the workpiece, then recordkeeping is appropriate, perhaps combined with prediction of remaining operating time until maintenance is required, based on the rate of increase of the inconsistency and tolerances required in upcoming operations. If the inconsistency suggests potential errors greater than the specified tolerances for the workpiece, then operations can be halted and the appropriate maintenance and repairs carried out. Finally, if the amount of inconsistency grows faster than a predetermined rate, the machine tool can be shut down to prevent damage and accidents.

There are numerous approaches to the implementation of the present invention. To illustrate the ideas and teach one skilled in the art the invention, a specific implementation, that of a machine tool whose tool bits are moved by a lead-screw nut on a lead screw, and whose high-resolution positional feedback is provided by a linear encoder, will be discussed in detail. One skilled in the art will be able to adapt the concepts to arbitrary machine tools and control systems. This detailed implementation is therefore not intended to limit the scope of the present invention.

Consider for discussion a machine tool (FIG. 1) comprising a tool bit 10 attached to a lead-screw nut 11, which moves along a lead-screw 12. The rotation of lead-screw 12 is controlled by an external drive and controller (not shown). A linear encoder 13 reading a linear position reference 14 measures the position of lead-screw nut 11, and hence the position of tool bit 10. The linear encoder produces a given number of pulses for a fixed amount of linear travel (e.g., 1 pulse per micron), the pulses being positive for positive displacement and negative for negative displacement. An independent measure of the motion of tool bit 10 is provided by reference disk 15, which generates a signal for each discrete quantum of rotation of lead-screw 12.

The quantum of rotation can, but need not be, a complete rotation. Simplicity of function suggests that an integral number of quanta per complete rotation of the reference disk be chosen. For the remainder of the present discussion, we shall assume one signal for each complete rotation of the reference disk. A simple implementation of reference disk 15 is shown in FIG. 1, where it comprises a slotted disk 16 with a slot 17 and fixed photodetector means 18 which detects passage of one of the edges of slot 17, thereby providing an absolute angular reference signal to the controller (not shown).

The controller integrates pulses from linear encoder 13, and combines this information with a well-characterized initial state of the machine tool and a detailed model of the known mechanical imperfections of the machine tool and the position feedback system to derive the current position of tool bit 10. The electronics required for this determination are well-known in the art, and could be a stand alone micro processor, or part of an open architecture PC-based machine tool controller.

The rotation of reference disk 15 provides a reference against which to test the motion of tool bit 10. Assume for simplicity that the machine tool is initially "perfect", that is, the lead-screw and nut have a constant pitch and no mechanical backlash or other aberrant behaviors are present. In this case, it is expected that the controller receive, e.g., 10000 pulses from linear encoder 13 per revolution of lead screw 12 as signaled by reference disk 15. As long as the machine tool performs "perfectly", this ratio will be constant, and is checked real time and bi-directionally during the operation of the machine tool.

In use, however, a machine tool will eventually fail to be "perfect". For example, if the bulk of the machine tool and linear position reference 14 have different thermal expansivities and the operating temperature of the machine tool varies with time, then an inconsistency will appear, indicated by a measurement differing from 10000 pulses per count of reference disk 15, and hence per revolution of lead screw 12. If contamination (e.g., dust or a finger print) obscures a portion of linear position reference 14, a number of expected pulses will not be generated, and the controller will record less than 10000 pulses per revolution of the lead screw 12, or per signal from reference disk 15. In both the above cases, and in general for systematic errors, the number of pulses per lead screw revolution should be equal in both directions. Similarly, if wear or contamination changes the amount of mechanical backlash in the machine tool, it will appear as a change in measurement each time the lead screw 12 (along with reference disk 15) changes directions.

In using the present invention with a real machine tool, it is necessary to characterize the behavior of the tool. Relevant factors are the effective pitch of lead-screw nut 11 and lead-screw 12, variations and irregularities of the effective pitch with position along the lead-screw, magnitude of mechanical backlash and other clearance-related sources of unwanted relative motion, and the like. These factors can be subsumed into a model of the machine tool operation, which can be programmed into the controller to correct the measured tool bit position for factors known to the operator at the start of functioning. The controller can further correct the real time data from the encoders, so that, e.g., 9985 pulses per count are expected when a sequence of motions results in unidirectional mechanical backlash. The output of the linear encoder is then made against this model number, instead of against a fixed, operations-independent number. Variations will then reflect a change in the magnitude of mechanical backlash and hence, a loss of machining accuracy and tolerance.

Note that there is an important safety function served by the precision displacement reference system. Should the number of pulses per reference disk signal vary dramatically from a predetermined number, it suggests that something has broken loose, or that one of the encoders or their associated electronics is malfunctioning. A safety system (emergency-stop) can be actuated to stop operations when such conditions are detected.

The output of this precision displacement reference system is a state variable reflecting the discrepancy between the measured pulses produced by linear encoder 13 and the expected pulses per reference disk signal. This output can be used in several ways. It can provide a real-time certification that the machining process under way is proceeding within the design tolerances. That is, if the state variable is less than N, the machine is operating with a precision and accuracy suitable for the procedure being undertaken. In this mode, the operator or the control software does not care what the source of the error is, but simply keeps all errors below a threshold value. (N is a number determined based on the design tolerances of the workpiece and the known characteristics of the machine tool.) If the state variable is greater than N, the machining operation is presumed to be faulty, and operation cease until maintenance, repairs, and recharacterization of the machine tool can be carried out.

Another application of the precision displacement reference system is to provide information which allows an operator to predict when maintenance of the machine tool is required, rather than simply depending on predetermined intervals. Maintenance and recharacterization of a precision machine tool is a time-consuming affair. Optimal operations require that such maintenance not be undertaken unless actually required. The controller can be set to monitor the state variable as a function of time. If N for a given type of operation is 10, then the length of time it takes for the state variable to change from, e.g., 4 to 8 allow the prediction of when the machine tool's performance will become substandard. This information can be used in real-time distribution of work amongst several similar machines, i.e., assign large upcoming projects to a machine whose state variable is small, so that they will be able to successfully be completed. Alternately, if no machine has a small enough state variable for completion of an upcoming project, that project might be delayed while a number of smaller projects are completed. Another mode of process control would be to send projects with looser machining tolerances to machines with larger state variables, thus preserving the most precise machines for the most precise projects.

Such factory optimization techniques will depend on the details of a given ensemble of tools and projects, and must be analyzed and applied to each individual situation. However, the ability to measure, in real-time, the present performance and the probable future performance of a machine tool provides a new and very powerful ability to optimize factory operations.

The discussion above has focused on a particular implementation of the precision displacement reference system. One skilled in the art will be able to conceive many related embodiments. The detailed description above is not intended to limit the scope of the invention. In particular, the driven input need not be rotary, the motion of the body need not be linear, and any suitable measuring devices may be substituted for the linear encoder or the reference disk.

What is claimed is:

1. A machine tool, comprising:
   i) a tool bit;
   ii) a tool bit positioner comprising a driven input;
   iii) a precision tool bit position measurer providing a measured tool bit position;
   iv) a driven input quantizer providing a running count; and,
   v) a tool monitor comprising:
      a) a measured tool bit position input;
      b) a running count input;
      c) a computer programmed to obtain a calculated tool bit position from said running count, and create an error signal by comparing the calculated tool bit position to the measured tool bit position; and,
      d) output means to make said error signal available for the monitoring and control of the machine tool.

2. The tool of claim 1, wherein the driven input quantizer comprises an optical encoder.

3. The tool of claim 1, wherein the driven input is rotary.

4. The tool of claim 3, wherein said tool bit positioner comprises a lead screw and a driven nut functionally connected to the tool bit.

5. The tool of claim 3, wherein said tool bit positioner comprises a rack and pinion functionally connected to the tool bit.

6. The tool of claim 3, wherein said tool bit positioner comprises a screw functionally connected to the tool bit and a driven nut on said screw.

7. The tool of claim 3, wherein the driven input quantizer comprises a reference disk with an optical reference pattern, said reference disk rotating with the driven input, and a fixed optical sensor positioned to detect the optical reference pattern as the reference disk rotates.

8. The tool of claim 3, wherein the driven input quantizer comprises a fixed reference disk with an optical reference pattern, and a rotary optical sensor rotating with the driven input positioned to detect the optical reference pattern.

9. The tool of claim 1, wherein the driven input is linear.

10. The tool of claim 9, wherein the driven input quantizer comprises a reference strip with an optical reference pattern, said reference strip moving linearly with the driven input, and a fixed optical sensor positioned to detect the optical reference pattern as the reference strip moves.

11. The tool of claim 9, wherein the driven input quantizer comprises a fixed reference strip with an optical reference pattern, and an optical sensor moving linearly with the driven input positioned to detect the optical reference pattern.

12. The tool of claim 1, wherein the precision tool bit position measurer comprises a linear encoder and a linear reference, the position of said linear encoder being functionally related to the position of the tool bit.

13. The tool of claim 1, wherein the precision tool bit position measurer comprises a rotary encoder and a rotary reference, the position of said rotary encoder being functionally related to the position of the tool bit.

* * * * *